United States Patent [19]

Band et al.

[11] Patent Number: 4,829,528
[45] Date of Patent: May 9, 1989

[54] INTERLOCKED RING INTRACAVITY RAMAN LASER METHOD OF GENERATING RAMAN SHIFTED LASER OUTPUT

[75] Inventors: Yehuda B. Band, Elizabeth; Donald F. Heller, Bound Brook; Jerzy S. Krasinski, Blairstown, all of N.J.; Jay R. Ackerhalt, Sante Fe, N. Mex.

[73] Assignee: Allied-Signal Inc., Morris Township, Morris County, N.J.

[21] Appl. No.: 247,825

[22] Filed: Sep. 22, 1988

[51] Int. Cl.[4] .............................................. H01S 3/30
[52] U.S. Cl. ......................................... 372/3; 307/426
[58] Field of Search ............................. 372/3; 307/426

[56] References Cited

U.S. PATENT DOCUMENTS

| 4,194,170 | 3/1980 | Kurnit | 372/3 |
| 4,297,600 | 10/1981 | Trutna, Jr. | 307/426 |
| 4,348,599 | 9/1982 | Pradere et al. | 307/426 |
| 4,389,617 | 6/1983 | Kurnit | 307/426 |
| 4,394,623 | 7/1983 | Kurnit | 307/426 |
| 4,618,783 | 10/1986 | Pradere et al. | 372/3 |

Primary Examiner—Léon Scott, Jr.
Attorney, Agent, or Firm—Gerhard H. Fuchs

[57] ABSTRACT

Device for providing a train of light pulses at Raman shifted frequency comprises a first ring laser (for fundamental frequency) and a second ring laser (for Raman shifted frequency). Both ring laser intersect in a Raman laser medium which is common to the cavity of both ring lasers. The Raman cavity has output means partially transmissive at Raman frequency. Length of first and second ring laser cavities differs by $\Delta L$. Injection of a fundamental pump pulse and a small Raman seed pulse into their respective cavities results in output of a train of Stokes pulses.

6 Claims, 4 Drawing Sheets

Fundamental Intracavity Intensity

INTERLOCKED RING INTRACAVITY RAMAN LASER METHOD OF GENERATING RAMAN SHIFTED LASER OUTPUT

BACKGROUND OF THE INVENTION

This invention relates to an improved laser device and method for obtaining a Raman shifted laser output of high intensity, and with controlled pulse envelope.

In the past, generation of light having Raman shifted frequency has been achieved by providing a Raman medium in a cell external to the laser cavity that generates light at a fundamental frequency. More recently, it has been shown that increased efficiency can be provided by a configuration in which the Raman medium is placed inside the cavity of the fundamental laser, or is itself in a cavity at the Raman frequency that is contained in whole or in part within a cavity at the fundamental frequency. A disadvantage of this later configuration is that a number of optical elements must be provided which are capable of withstanding the intensities of the different frequency light fields. Further, such a system requires the use of dichroic optical elements and dielectric coatings, which are expensive and are susceptible to damage. For a discussion of such a device see U.S. Pat. No. 4,618,783 to Pradere et al. Such devices produce Raman pulses having fixed durations that are longer than a few nanoseconds.

Other Raman type devices are discussed in R. Frey A. Martino and F. Pradere, Optics Letter 8, 437 (1983): R. Frey A. Martino and F. Pradere, IEEE J.Q. Electron QE-20, 786 (1984): F. DeRougemont, D. K. Xian, R. Frey, and F. Pradere, Optics Letters 10, 460 (1984). See also J. R. Ackerhalt, Y. B. Band, J. S. Krasinski, and D. F. Heller, Opt. Lett 13, 646 (1988) which discusses aspects of this invention.

Notwithstanding the high cost and complicated construction of the prior art devices for obtaining Raman output, it is still desirable to obtain such Raman output, for several reasons. Intracavity Raman conversion is an effective means of (1) producing first (or second) Stokes shifted radiation with high quantum conversion of frequency (2) extracting energy efficiently from low emission cross-section media: (3) effecting significant beam cleanup in the sense that the Raman beam is comprised of fewer spacial modes than the fundamental pump beam: and (4) producing short Raman shifted pulses having adjustable time durations.

An additional advantage results when an intracavity Raman laser is used as a non-linear output coupler for low cross-section gain media In this case, the flux in the pump laser cavity can build up to a set maximum level before outcoupling turns on. The Raman laser thus acts as a power limiter for the pump laser. This permits extraction of the Raman output to take place under more efficient high fluence conditions without risk of optical damage.

SUMMARY OF THE INVENTION

In accordance with one aspect of the invention, there is provided an improvement in a laser device, for providing a train of light pulses at the Raman shifted frequency comprised of a Raman medium in a cavity for storing energy delivered by a laser whereby the energy is extracted from the cavity as Stokes shifted pulses The improvement is provided by employing a novel interlocking ring cavity configuration. In this configuration, two ring laser cavities are provided for light at the fundamental and Raman shifted frequencies. The first, fundamental laser cavity has a separate gain medium for light at the fundamental frequency. This first ring laser cavity is partially concurrent with the second ring laser cavity for light at the Raman shifted frequency. A Raman laser medium is located at a point common to both cavities where the light beams from the first and second ring laser cavities intersect. An output means which is partially transmissive at the Raman frequency is located in the Raman cavity. The lengths of the first and second ring laser cavities are adjusted to differ by an amount $\Delta L$. A pump pulse and a small Raman seed pulse are initially injected into their respective cavities. Both injected pulses are shorter than their cavity trip times. By delaying injection of the pulse into the shorter cavity, the separation time between the pulses is reduced by $\Delta L/c$ on each round trip. As the pulses begin to overlap in the Raman cell, Raman conversion becomes possible Once threshold is reached, pump photons are converted to Stokes photons in the pulse overlap region. Since only a fraction of the Stokes pulse is coupled out of the cavity, the intercavity Stokes pulse overlaps on successive round trips, with a new unconverted and further amplified portion of the pump pulse of duration $\Delta L/c$, and generates additional intense Stokes pulse of this same time duration. The intracavity pump pulse is successively shortened with each round trip by an amount $\Delta L/c$. This narrowing of the pump pulse takes place from either its leading or trailing edge as fixed by the cavity lengths. This train of Stokes pulses continues until the entire pump pulse is depleted, and the intracavity Stokes energy has decayed. The Stokes output consists of a train of pulses, each pulse of duration $\tau_{out} = \Delta L/c$, separated by the Stokes cavity round trip time. This configuration reduces the number of optical elements common to both cavities, thereby increasing the ability of the device to withstand the intracavity light fields.

In another more specific aspect, the invention provides that the respective laser cavities have cavity round trip times that differ with this difference being preferably adjustable.

These devices are particularly useful in a process whereby seed pulses of light at the fundamental and/or Raman frequency are injected into the laser cavities before laser light builds up in them.

On problem associated with the high average power operation of intracavity Raman lasers is thermal lensing and associated thermo-optical aberrations in the Raman medium. This is a consequence of the dissipation of significant amounts of energy within the Raman medium. These aberations can severely degrade the quality of the beam produced and can cause a reduction in the Raman laser's output. These effects can be mitigated by the use of a Raman cell having a means for providing flow of the Raman medium within the cell in a direction transverse to the propagation of the optical beam. A preferred way to do this is to use a cell containing an internal agitator, such as a fan or stirrer.

Another problem associated with tunable intracavity Raman lasers is the control of the laser output frequency. Precise frequency control is difficult to effect in a high gain laser such as a Raman laser. However, because the frequency of the Raman laser is largely determined by the frequency of the pump laser, which typically has lower gain, it is often sufficient to control the frequency of the latter. This can be done using conventional intracavity tuning elements, e.g., birefringent tuners, gratings, etalons, etc. However, these elements introduce losses and are subject to damage (particularly etalons) at the high circulating powers present inside the pump laser cavity. A preferred method is to use an external narrow band light source to provide "seed" photons at the desired pump laser frequency. These photons are injected into the cavity of the pump laser, and, if present in sufficient quantity, determine the frequency of the light that builds up inside the pump laser cavity and, consequently, the frequency of the Raman laser output. By utilizing said photons from a spectrally narrow light source, the pump laser frequency and, consequently, the frequency of the Raman laser output can be controlled within relatively narrow predetermined limits. The bandwidth of the Raman laser output equals the square root of the sum of the squares of the pump laser frequency and the width of the Raman line. A preferred embodiment uses an intracavity Raman laser based on an alexandrite pump laser and a hydrogen Raman cell, and a diode laser operating at a wavelength between 700–830 nm and a bandwidth in the order of about 100 MHz as an injection source. In this manner, in accordance with the adjustment, part of each pulse of the first train of pulses of the fundamental can be converted to Raman light to result in a third train of intense Raman pulses of predetermined and adjustable pulse envelope.

In another aspect, this invention provides method of obtaining the Raman pulse output, utilizing the principle of operation described above.

BRIEF DESCRIPTION OF THE DRAWINGS

Having briefly described the invention, the same will become better understood when read in conjunction with the following detailed discussion taken with reference to the attached drawing wherein.

DETAILED DISCUSSION OF THE INVENTION

In accordance with the invention, short laser pulses of controlled pulse duration are produced by means of an intracavity pumped Raman laser apparatus. This apparatus is comprised of a first ring laser comprising a unidirectional fundamental pump laser cavity, and a second ring laser comprising a copropagating unidirectional laser cavity for the Stokes shifted Raman light. A Raman gain medium is provided, common to both rings In operation, a train of short intense output pulses of equal pulse duration are produced at Stokes shifted fundamental frequency so that the output pulse duration will equal the difference between the two cavity round trip times and is therefore, easily adjustable by controlling these differences. The pulses are spaced apart by the Raman cavity trip time and the time envelope of the pulses is determined by several factors which include the Q of the Raman cavity, the smaller of the two input pulse durations, and the gain lifetime of the pump laser. Accordingly, this method of producing short intense pulses is easy to implement and capable of generating extremely intense short pulses and well known to those of ordinary skill in the art once the basic principle is explained as above.

Figure 1:
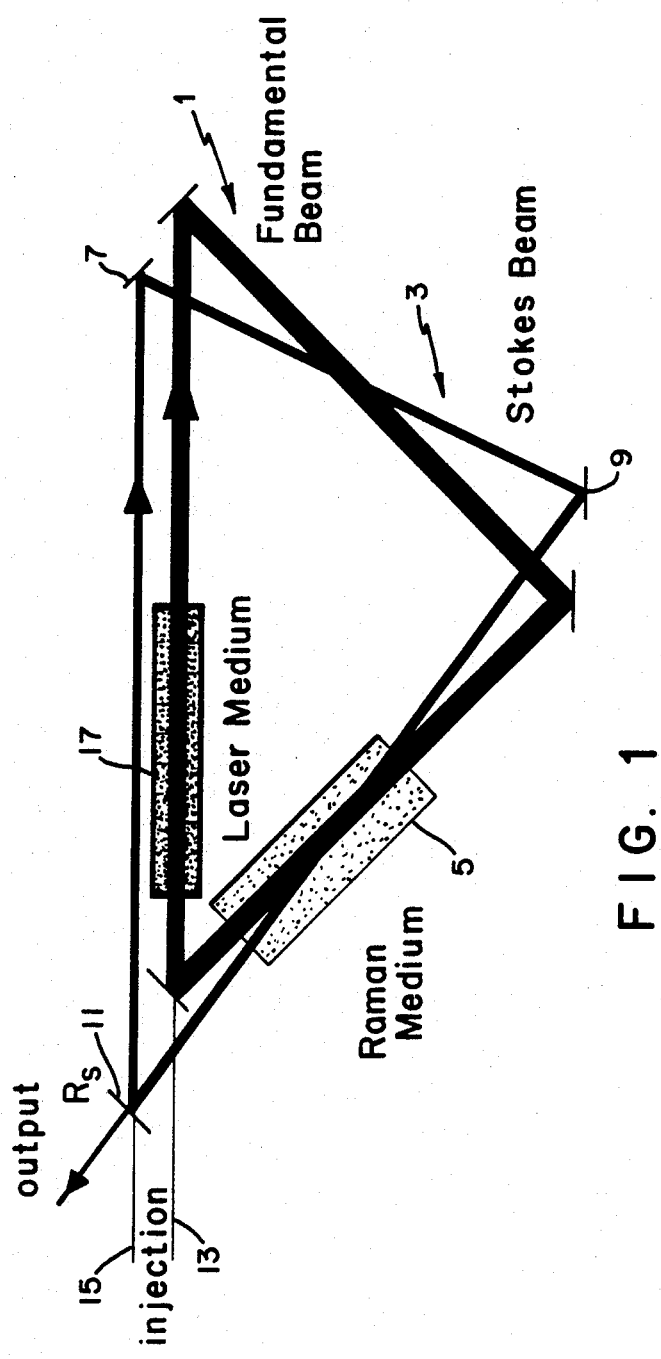
FIG. 1 is a schematic drawing of an intracavity Raman ring laser geometry in accordance with a preferred aspect of the invention.

A preferred device in accordance with the invention is schematically shown in FIG. 1. A unidirectional ring laser producing a fundamental frequency beam 1 and a copropagating, or nearly copropagating, unidirectional ring laser for the Stokes shifted Raman frequency beam 3 are arranged to intersect in the Raman gain medium 5 common to both rings. The fundamental ring contains a separate gain medium 17 and the cavity lengths of the two ring lasers are arranged to differ by an amount $\Delta L$ by adjusting the cavity lengths such that the cavity round trip times differ by the desired output pulse duration, i.e., $\Delta L/c = \tau_{out}$. It is only necessary to output-couple at the Stokes frequency.

As shown in FIG. 1, both the pump and Raman cavities contain the Raman gain medium 5. The Stokes cavity includes the two mirrors 7 and 9, which are highly reflective at the Stokes shifted frequency and highly transmissive at the pump frequency A third mirror 11, which is partially reflective at the Stokes frequency, in the Raman cavity serves as the outcoupler.

The Raman medium 5 is common to both cavities. Preferably, it is a hydrogen cell. In operation, a fundamental "seed" pulse 13 and small Raman "seed" pulse 15 are injected into the pump and Stokes cavities. One pulse is delayed relative to the other, so that the two pulses begin to overlap in successive trips through the cavities.

When the fundamental pulse overlaps the seed Raman pulse within the Raman medium 5, the fundamental pulse is converted into Raman light through stimulated Raman scattering. The pulse of Raman frequency beam 3 thus generated is then partially outcoupled through the partially reflecting mirror 11, which serves as the output coupler for the Raman cavity. On the other hand, some significant fraction of the pulse of Raman frequency beam 3 remains within its cavity, and on successive round trip passes through the cavities, more and more of the fundamental pulse will be converted to Stokes light, and the fundamental pulse will become successively narrower as it is consumed (see FIG. 2).

In operation, the consumption of the fundamental pulse can occur from either its leading or trailing edge, depending upon the initially pulse delay in cavity lengths. The gain at the Stokes frequency occurs only during the overlap of the fundamental and Stokes pulses which last for a time duration $\Delta L/c$. The conversion of the fundamental continues until the fundamental and Stokes pulses can no longer overlap within the rate medium. At this point, short pulses will continue to be emitted each time the remaining intracavity Stokes pulse impinges upon the output coupler, until the Stokes pulse is drained from the cavity.

For efficient conversion to occur during the overlap of the pump and Stokes pulses inside the Raman medium 5, it is preferable that the response time of the Raman medium 5, i.e., the $P_2$ time of the polarization at the Stokes frequency, be small compared with the overlap time ΔL/c. Otherwise, the Raman conversion efficiency may not be sufficient to consume the fundamental during the overlap with the seed Stokes pulse. In this regard, as the Raman medium 5, although gaseous hydrogen is preferred, other materials, such as molecular liquids or gases generally, can be used. In such a case of alternate material selection, high pressure gasses, liquids and solids will have short $T_2$ Raman polarization times. Exemplary alternate materials include $H_2$, $D_2$, $N_2$, $O_2$ and $CH_4$ in gaseous form, and $N_2$ and $O_2$ in liquid form.

Figure 4:
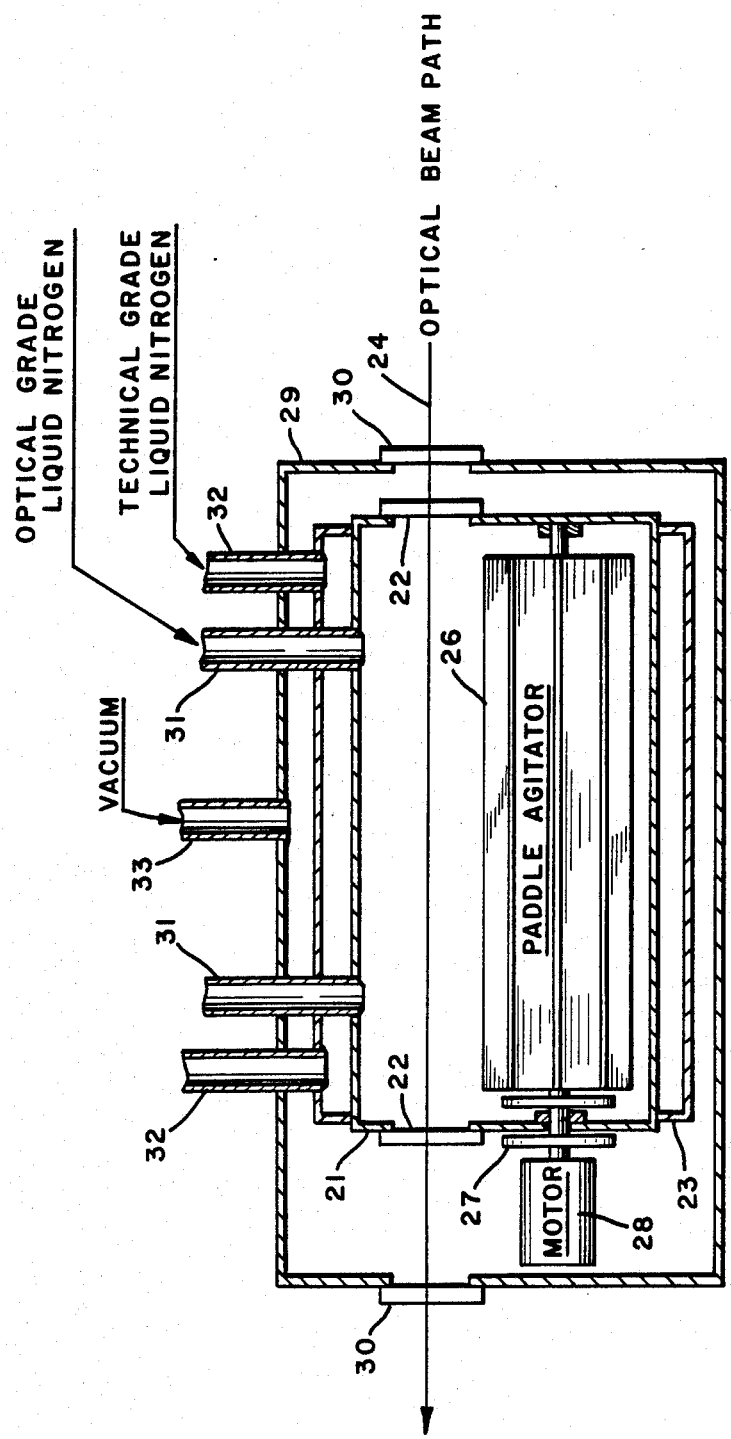
FIG. 4 shows a schematic representation of a preferred embodiment of a Raman cell containing an internal agitator. The agitator mixes the Raman medium assuring good optical quality of the medium. In this example, the agitator is powered by an electric motor with the help of a magnetic clutch.

FIG. 4 schematically represents a cross-sectional view of typical liquid nitrogen Raman cell suitable for use in the present invention. An inner cavity 21 is limited by a pair of parallel optical windows 22. Inner cavity 21 is filled with optical grade liquid nitrogen. Cooling for inner cavity 21 is provided by technical grade liquid nitrogen contained in outer mantel 23 surrounding inner cavity 21 Within inner cavity 21, but outside of optical beam path 24, there is provided a paddle agitator 26 for effecting lateral flow of the optical grade liquid nitrogen across the optical beam path. Paddle agitator 26 is driven via magnetic clutch 27 by electric motor 28 located outside of the inner cavity. The whole apparatus is enclosed in a vacuum chamber 29, which is equipped with a pair of optical windows 30 within the optical beam path. Connections 31, 32 and 33 respectively serve to introduce the optical grade liquid nitrogen into inner cavity 21; technical grade liquid nitrogen into outer mantle 23; and to provide communication with the vacuum source for the vacuum chamber 29. The Raman cell described here is preferred for use in the present invention: other types of construction of Raman cells are known and are also suitable Those skilled in the art can readily select a cell suitable for their specific purposes.

In understanding the operation of the invention, a theoretical frame work for a model which can be constructed from well known analytic solutions of the intracavity per Stokes Raman conversion within the unidirectional ring laser must be developed It is particularly important to have analytic solutions in the Raman medium 5 for the case where the single-pass Raman gain is very large When this occurs, a sharp front develops making numerical integration very difficult. In the following calculations, an assumption has been made that the Raman and fundamental beams are nearly colinear allowing modeling of the conversion process by using a plane-wave theory. In practice, the beams are slightly off axis, in effect, averaging over fluxuations in the pump beam.

In the Raman cell, an assumption is made that the polarization is in steady-state, thus simplifying the "first-order" Maxwell's equations for the fundamental and Stokes beams $$\partial I_p/\partial X = -g\, I_p I_s, \quad (1)$$

$$\partial I_s/\partial X = \omega_s/\omega g\, I_s I_p \quad (2)$$

In the above equations, $I_i$ refers to the intensity of the $i^{th}$ beam, g is the Raman gain factor and $\omega(\omega_s)$ is the fundamental (Stokes) frequency. The group velocities of the two fields are set at equal for the sake of simplicity. Accordingly, the intensities $I_i(x, \tau)$ are functions of both distance in the Raman cell, x, and the local pulse time, $\tau$. The formal solutions to the above two equations 1 and 2 are $$I_s(x,\tau) = I_s(O,\tau)\omega_s\Phi(\tau)\exp(g\omega_s\Phi(\tau)x)/\{\omega_s\Phi(\tau) + I_s(O,\tau)[\exp(g\omega_s\Phi(\tau)x) - 1]\}$$

$$I_p(x,\tau) = \omega\Phi(\tau) - (\omega/\omega_s)I_s(x,\tau)$$

where $\Phi(\tau)$ is the total photon flux,
$\Phi(\tau) = I_p(x,\tau)/w + I_s(x,\tau)/\omega_s(s)$ By using the first two equations it is easy to show that $\Phi(\tau)$ is independent of position in the Raman cell and as such, $\Phi(\tau)$ can be evaluated at whatever point x is convenient including x=0.

In the amplifier cell, it is necessary to solve for both the propagation dynamics of the fundamental beam and the temporal dynamics of the excited-state population density. The equations describing these are $$\partial I_p/\partial x = (\sigma - \sigma_{ex})nI_p$$

$$\partial n/\partial \tau = -\sigma/\omega_p n\, I_p - n/\tau_f$$

where $\sigma$ and $\sigma_{ex}$ are the stimulated-emission and excited-state absorption cross sections, and $\tau_f$ is the lifetime of the excited-state population. In this case, there is considered a four level laser with small lifetimes of the pump state and terminal laser level Assuming $\tau_f$ is large compared with the incident pulse duration, solutions to the above two equations become $$n(x,\tau) = n(x,0)\exp[-E(X,\tau)/E_{sat}]$$
$$I(x,\tau) = I(L_r,\tau)\exp[E(L_r,\tau)/E_{sat}]/\{\exp[E(L_r,\tau)/E_{sat}] + \exp[-(\sigma - \sigma_{ex})G(x)] - 1\}$$

where $L_r < x < L_r + L_1$. The saturation energy per unit area, the pump pulse energy per unit area and the integrated population density are defined as $E_{sat} = \omega/\sigma$, $$E(x,\tau) = \int_0^\tau I(x,\tau')d\tau', \text{ and}$$

$$G(x) = \int_{L_r}^x n(x', L_r)dx',$$

respectively. If the pump fluence, is small compared to $E_{sat}$, i.e, saturation of the laser gain does not occur, then the last equation above reduces to $$I(x,\tau) = I(L_r,\tau)\exp[(\sigma - \sigma_{ex})G(x)].$$

The input and output coupling of the fundamental and Stokes fields are located at mirrors positioned just after the Raman cell, x=L. $R_p$, $R_s$ are the pump and Stokes wave mirror reflectivities. The output of the pump and Stokes beams are gien by $(I - R_p)I_p(x = L_r, t)$ and $(1 - R_s)I_s(x = L_r, t)$, respectively. The fields which continue to propagate in the ring cavities are $$I_p(x = L_r + \epsilon, t) = R_p I_p(x = L_r, t) + \Gamma_p(t),$$

$$I_p(x = L_r + \epsilon, t) = R_s I_s(x + L_r, t) + \Gamma_s(t),$$

where $\epsilon$ is an infinitesimally small number. $I^\circ_p(t)$ and $I^\circ_s(t)$ are the source "tee" terms which initiate both the laser amplification of Raman conversion processes. In the following description $R_p$ is said to be equal to 0. The initial conditions for propagation in the ring cavities are $I_p(x,0) = I_s(x,0) = 0$, and $n(x,0) = n_{initial}$.

By using the form of the analytic solutions in the Raman and the laser regions coupled with the boundary conditions, a complete solution for the fields over the entire propagation path in the respective ring cavities can be generated. The results in operation are presented in Table 1, below, based on the parameters listed therein.

Table 1, Intracavity Raman Converter Parameters (cgs units except where otherwise indicated)

$E_{injected}$(Joule) = 0.10
$\tau_{pulse}$ = 1.0 E−9
Beam diameter = 0.3
$\lambda$ = 7.50E−05
$L_p$ = 100
$L_l$ = 10
$L_v$ = 61.11
$L_r$ = 33
$L_s$ = 100
$L_v$ = 67
$R_p$ = 1.0
$R_s$ = 0.1
$g[J/cm^2/s/cm)^{-1}]$ = 4.08E-07
$\sigma$ = 1.458E−20
$\sigma_{ex}$ = 1.874E−21
$n(x,t=0)$ = 4.461E+18
$n_p$ = 1.74

The gain medium corresponds to highly pumped alexandrite crystal ($n_{initial} \cong 0.3N$, where N is the active site concentration). The Raman gain medium corresponds to hydrogen gas at high pressure such that $T_2$ satisfies the steady-state approximation.

Figure 2A:
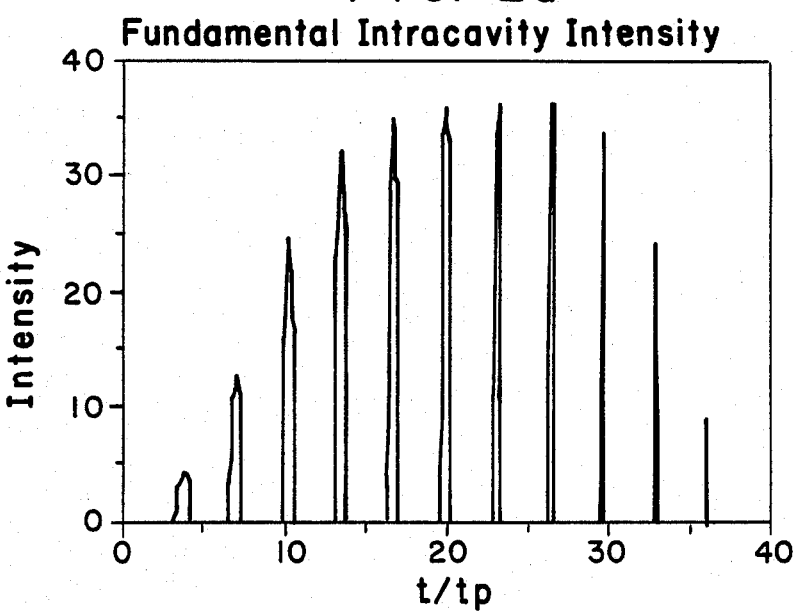
FIGS. 2a and 2b are graphs relating output Raman intensity and intracavity pump intensity at the end of the Raman cell versus time, with the intensities being normalized to the maximum intensity of the injected beam and the time being given in units of the input beam pulse width.
Figure 2B:
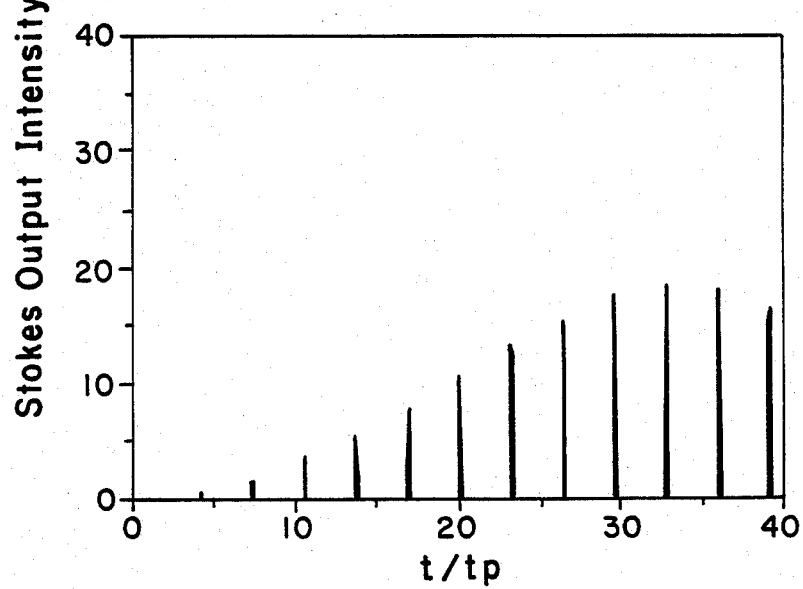

In FIGS. 2a and 2b there is plotted the output Raman intensity, and the intracavity fundamental intensity at the end of the Raman gain medium vs the time in units of the injected pulse width. The intensities are normalized to the maximum intensity of the injected beam. The fundamental intracavity intensity builds with time during successive passes through the pump laser gain medium until saturation of the gain takes place.

On successive passes through the cavity, more of the leading edge of the fundamental pulse is converted into Stokes light, until all of the fundamental beam is consumed. The peak intensity of the last several intracavity pulses decrease because only the trailing edge of the pulse is left and the intensity of the trailing edge is less than the intensity of the idle part of the intracavity pulse, and there is no gain left to amplify the trailing edge because of gain depletion. Short output Raman pulses thus continue to be emitted each time the intracavity Stokes pulse remaining impinges upon the output coupler, until the Stokes pulse is drained from the cavity.

Figure 3A:
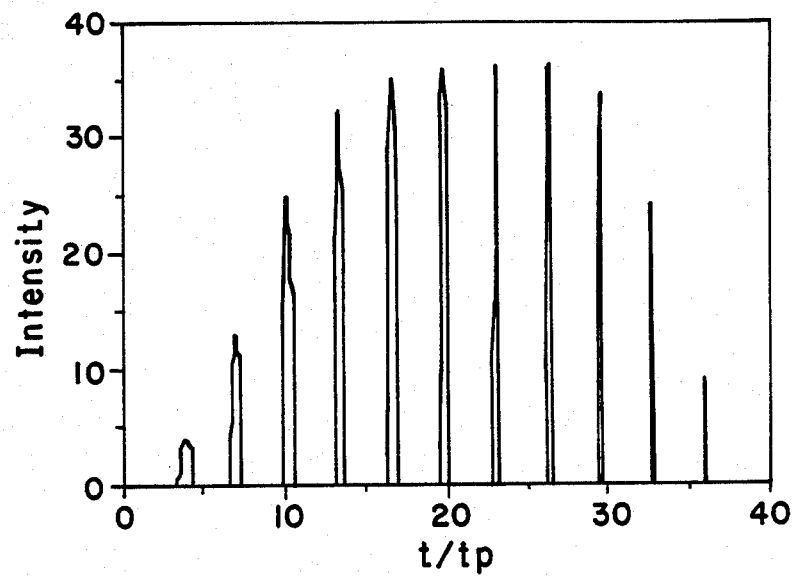
FIGS. 3a and 3b are the same as in FIG. 2a and 2b except that the value of $R_s$ is set at 0.8.
Figure 3B:
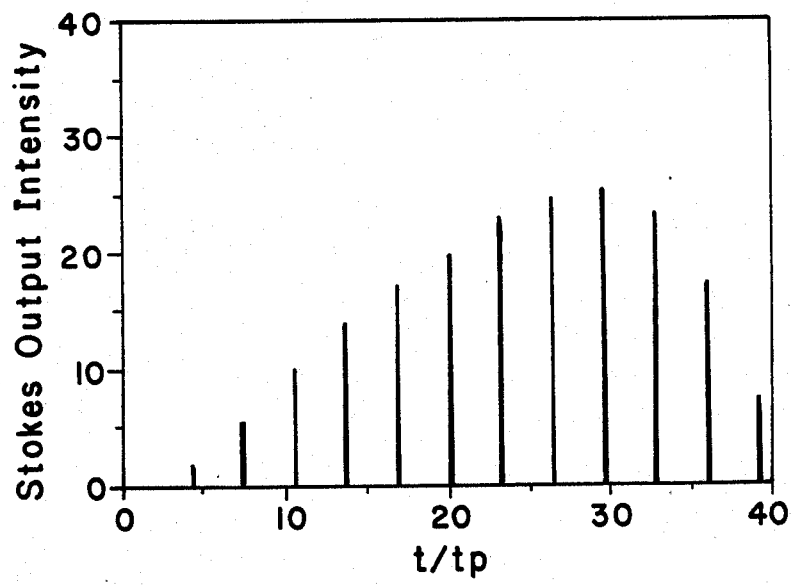

As can be seen herein, the results of FIGS. 3a and 3b are similar to FIGS. 2a and 2b, except that $R_s$ is equal to 0.1 instead of 0.8, i.e., the output coupling is greater.

Since various changes and modifications may be made in the invention without departing from its spirit and essential characteristics, it is intended that all matter contained in the description shall be interpreted as illustrative only and not in a limiting sense, the scope of the invention being defined by the appended claims.

We claim:

1. A laser device for producing short pulses with controlled pulse duration at a Raman shifted frequency, comprising:
   first unidirectional fundamental ring laser cavity means for generating a first train of laser pulses;
   second copropagating unidirectional ring laser cavity means for generating a train of laser pulses of Stokes shifted Raman light, with said second laser cavity having a cavity round trip time different from the round trip time of said first cavity by a predetermined amount, and with said difference being adjustable;
   Raman gain medium means common to said first and second cavity means for having the first and second trains of pulses intersect therein to convert part of each pulse of the first train of pulses to Stokes light through stimulated Raman scattering to result in a third train of intense Raman shifted pulses of predetermined envelope; and
   outcoupling means for outcoupling said third train of pulses.

2. The laser device of claim 1, wherein the Raman gain medium means incorporates a molecular gas or liquid, and means for providing flow of the gas or liquid in direction generally transverse to the propagation path of the optical beam.

3. The laser device of claim 1 including means for injecting seed photons from a spectrally narrow light source having band width of not more than about 100 MHz.

4. The laser device of claim 3 wherein the pump gain medium is alexandrite.

5. The laser device of claim 2 wherein the pump gain medium is alexandrite and the Raman gain medium incorporates one or more of $H_2$, $N_2$, $D_2$, $O_2$ or $CH_4$ in gaseous form, or $N_2$ or $O_2$ in liquid form.

6. The laser device of claim 1 including semiconductor diode laser means operating between 700 and 830 nm for injecting seed photons into the first unidirectional ring laser cavity means

* * * * *